(12) United States Patent
Merlo et al.

(10) Patent No.: US 6,426,607 B1
(45) Date of Patent: Jul. 30, 2002

(54) PROGRAMMABLE SYSTEM AND METHOD FOR REGULATING AN ALTERNATOR

(75) Inventors: Mauro Merlo, Pavia (IT); David F. Swanson, Howell, MI (US)

(73) Assignees: STMicroelectronics, Inc., Carrollton, TX (US); STMicroelectronics, Srl., Agrate Brianza (IT)

( * ) Notice: Subject to any disclaimer, the term of this patent is extended or adjusted under 35 U.S.C. 154(b) by 0 days.

(21) Appl. No.: 09/434,051

(22) Filed: Nov. 4, 1999

(51) Int. Cl.$^7$ .................................................. H02J 7/04
(52) U.S. Cl. ........................................ 320/150; 320/137
(58) Field of Search ............................... 320/150, 137, 320/152, 132, 136

(56) References Cited

U.S. PATENT DOCUMENTS

| | | | | |
|---|---|---|---|---|
| 4,394,742 A | * | 7/1983 | Crummer et al. ............ 701/102 |
| 4,659,977 A | | 4/1987 | Kissel et al. ................. 320/150 |
| 5,038,728 A | | 8/1991 | Yoshida et al. .............. 123/198 |
| 5,080,059 A | | 1/1992 | Yoshida et al. .............. 123/198 |
| 5,298,851 A | | 3/1994 | DeNardis ...................... 322/28 |
| 5,589,757 A | | 12/1996 | Klang ........................... 320/161 |
| 5,610,499 A | | 3/1997 | Rogers ........................... 322/25 |
| 5,883,497 A | * | 3/1999 | Turnbull ...................... 320/132 |
| 5,966,001 A | * | 10/1999 | Maehara et al. .............. 322/28 |
| 6,222,349 B1 | * | 4/2001 | LeRow et al. ................. 322/34 |

* cited by examiner

Primary Examiner—Jessica Han
Assistant Examiner—Lawrence Luk
(74) Attorney, Agent, or Firm—Lisa K. Jorgenson; Christopher F. Regan

(57) ABSTRACT

A system and method regulates an alternator charging system and includes a memory for storing and regulating voltages used at specific temperatures for the specific alternator charging system requirements of an alternator. A circuit generates a digital signal indicative of both temperature of a battery supplied by the alternator charging system and the charging system voltage. A digital comparator receives the digital signal and compares the digital signal with the regulating voltage stored within the memory for the specific temperature that is indicative of the temperature of the battery supplied by the alternator charging system to generate a regulator control signal.

18 Claims, 3 Drawing Sheets

Comparison of digital steps Vs a typical multiple slope analog specification

PROGRAMMABLE SYSTEM AND METHOD FOR REGULATING AN ALTERNATOR

FIELD OF THE INVENTION

This invention relates to the field of alternators, and more particularly, this invention relates to the field of regulating an alternator charging system.

BACKGROUND OF THE INVENTION

In an automobile system, an alternator charging system maintains a substantially constant battery voltage and usually includes an alternator with voltage regulator and a rectifier bridge. The alternator supplies the energy to the battery for recharging the battery and is typically proportional to the current flow through its field windings at a given alternator RPM. The voltage regulator controls the output of an alternator in accordance with the voltage level of the battery by controlling the current flow through the field windings of the alternator. The voltage regulator senses when the battery voltage drops below a specified voltage level and applies current to the field windings of the alternator thereby providing the charging current from the alternator to the battery. After the battery voltages reach a desired voltage level, the voltage regulator stops current flow to the field windings and terminates the charging. A pulse width modulated (PWM) control algorithm can be used and actually does not stop current flow by the inductive nature of the field windings. When the voltage is applied to a field winding, the current ramps up and when the voltage is removed, the current ramps down. In a PWM situation, the current is constantly ramping up and down at a much slower rate than the frequency of the PWM duty cycle. This makes for a fairly constant current in the field windings. The level of this current is determined by the rotational speed of the field rotor, the loading on the alternator, and the desired voltage the regulator is trying to regulate at.

As is well known to those skilled in the art, the amount of voltage level at which the battery is charged depends on the battery temperature. At low temperatures, the battery only has to be charged at a lower voltage and can handle more charging current as compared to hotter temperatures. Some voltage regulators, such as used with General Motors and Ford vehicles, use integral temperature sensors that provide feedback to approximate the temperature of the battery and account for different temperatures of the battery. Most regulators are commonly formed integral with the alternator and operate at the temperature of the alternator and this system is commonly used to reflect battery temperature.

One type of microcomputer controlled electronic alternator for automobiles is disclosed in U.S. Pat. No. 4,659,977, assigned to Chrysler Motor Corporation, the disclosure which is hereby incorporated by reference in its entirety. This system uses the microcomputer intelligence for controlling engine operation to improve the charging system. This type of system eliminates a conventional voltage regulator. The microcomputer senses when a vehicle decelerates and charges the battery to a high voltage level during the periods of deceleration, thus using some of the momentum of the vehicle that is usually wasted in the converted form of vehicle breaking and heat. The additional load placed on the engine assists in slowing the vehicle. However, the system uses the main engine controller and processor. There are also hybrid regulators on the market that can be programmed by a hybrid resistor change. One drawback of this type of system is that they are limited to a one slope system and must be set at the construction of the regulator.

Other designs have used mask level programming for different alternator charging systems and regulators. These were complex and required difficult circuits to manufacture and complicated digital and analog circuits. Also, because of a unique mask that may have been generated for a unique alternator arrangement, different regulators were required. Slope programming had also been limited to mask level programming.

SUMMARY OF THE INVENTION

It is therefore an object of the present invention to provide a programmable alternator charging system that is adaptable for different alternator charging systems based on the specific alternator charging system requirements of an alternator.

The present invention is advantageous and provides a programmable temperature compensation slope for an automotive charging system regulator. In the prior art, as noted before, slope programmability was limited to mask level programming. Mask level programming required layout changes, new mask sets to be generated, and time for this effort as well as to fabricate the new devices.

The implementation of multiple slopes required new band gap circuits for each slope used. The complexity of charging system regulation has increased to where new and multiple slope temperature compensation is becoming the norm. The programmable system of the present invention is performed digitally.

In accordance with the present invention, the system and method regulates an alternator charging system and includes a memory for storing the regulating voltages used at specific temperatures for the specific alternator charging system requirements of an alternator. The memory can typically be formed as a nonvolatile memory, such as a semiconductor circuit memory that can be programmed for the specific alternator charging system requirements of an alternator.

A circuit generates a digital signal indicative of both the temperature of a battery supplied by the alternator charging system and the charging system voltage. A digital comparator receives the digital signal and compares the digital signal with the regulating voltage stored within the memory for the specific temperature indicative of the temperature of the battery supplied by the alternator charging system and generates a regulator control signal that is fed to a regulation control loop of the alternator charging system.

In accordance with the present invention, a temperature measuring circuit as part of the regulator can measure the temperature of the battery supplied by the alternator charging system and generate an analog temperature signal corresponding to the measured temperature. A multiplexer receives the analog temperature signal and the analog signal indicative of the charging system voltage and multiplexes the two signals into a multiplexed signal. An analog-to-digital converter converts the multiplexed signal into a digital signal. An n-bit latch receives the digital signal. The n-bit latch can comprise an 8-bit latch. An error amplifier circuit can receive and amplify an analog signal indicative of the charging system voltage.

A method is also disclosed and comprises the steps of storing in a memory the regulating voltages used at specific temperatures for the specific alternator charging system requirements of an alternator. A digital signal is generated indicative of the temperature of a battery supplied by the alternator charging system and a charging system voltage. This digital signal is digitally compared with the regulating voltage stored within the nonvolatile memory for the specific temperature and is indicative of the temperature of a battery supplied by the alternator charging system.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

The invention as set forth in the claims and detailed description is advantageous and provides a digitally programmable regulator that can be assembled into an alternator and then programmed. This minimizes part numbers and reduces inventory and simplifies inventory handling. The slope is one of many parameters that can be programmable making a totally flexible charging system until the time of delivery.

Figure 1:
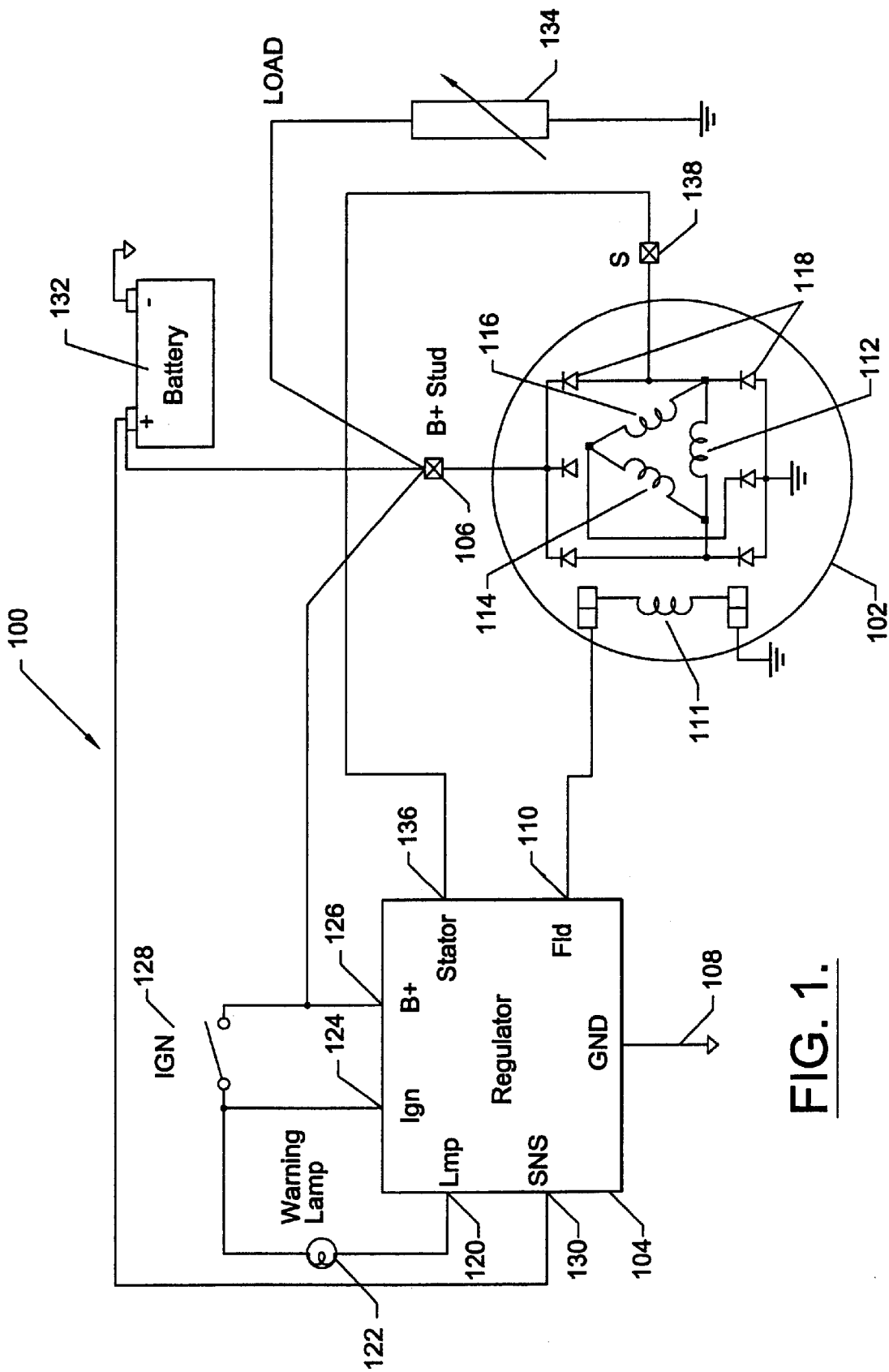
FIG. 1 is a basic schematic circuit diagram showing the operation of an automotive charging system.

FIG. 1 illustrates a simplified block diagram of a charging system 100, such as used in an automobile circuit. The alternator is illustrated at 102 and is formed as a current mode machine that is controlled by sensing a voltage, as is well known to those skilled in the art. A regulator is illustrated at 104 and determines the amount of field current required by monitoring the voltage at the output of the alternator 102 at the B+ stud 106 corresponding to the battery connection. The regulator often is inside the alternator housing. In some designs, the current can be regulated by means of a pulse width modulated signal that typically has a frequency of about 200 to 400 Hz. The regulator 104 can include a ground terminal 108 and a field terminal 110 connected to the alternator 102 and its field terminal 111. The field rotates inside the alternator, as is well known to those skilled in the art, and includes the appropriate coils for the three stators as shown at 112, 114 and 116. Appropriate diodes 118 are also included in the alternator 102. The regulator 104 includes a lamp terminal 120 that connects to a warning lamp 122. An ignition terminal 124 and battery terminal 126 connect to the ignition switch 128, as is well known to those skilled in the art. A SNS 130 terminal connects to the battery 132, which in turn connects to the B+ stud 104 and ground. The vehicle load is shown at 134. A stator terminal 136 connects to stator terminal 138.

Figure 2:
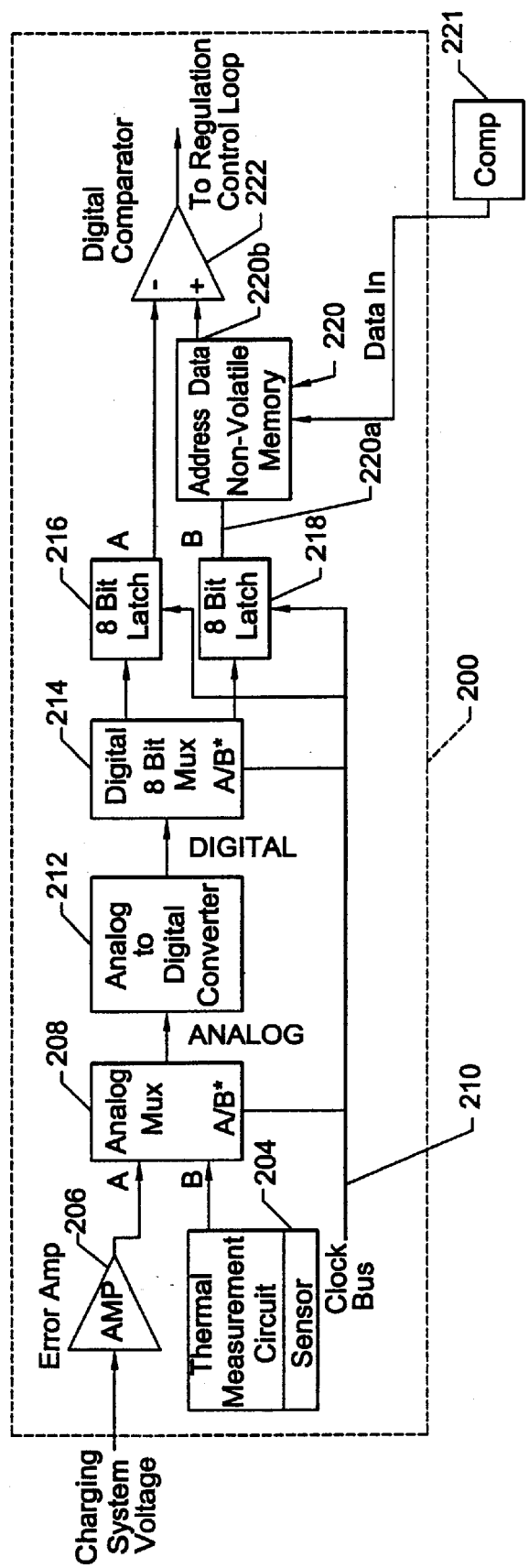
FIG. 2 is a block invention with the basic components of the present invention showing the analog and digital components.

Referring now to FIG. 2, there is illustrated a basic block diagram of the system of the present invention. The block components as illustrated can be manufactured as one integrated circuit chip indicated by the dashed line configuration at 200, and manufactured by techniques well known to those skilled in the art. A thermal measurement circuit that acts as a sensor is illustrated at block 204 and is typically integral with the regulator and generates an analog temperature signal corresponding to the measured temperature of a battery supplied by the alternator charging system. This analog temperature signal is labeled as B in FIG. 2.

Many modern cars now have thermal measuring circuits that automatically measure battery and charging system temperatures. The charging system voltage is forwarded as an analog signal into an error amplifier 206 that produces an analog charging system voltage labeled as A. The analog charging system signal (A) is multiplexed together with the analog temperature signal (B) in an analog multiplexer 208 and controlled by clock signals produced by the clock bus 210 as part of the chip 200. A multiplexed analog signal is produced and forwarded to an analog-to-digital converter 212 that converts the multiplexed analog signal into a digital signal that is then forwarded to a digital 8-bit multiplexer 214 that produces 8-bit A/B data units. The 8-bit multiplexer 214 is also controlled by the clock bus 210. Two output signals are then forwarded to respective 8-bit latch circuits 216, 218 to produce latched A and B signals.

A memory circuit 220 is formed as a nonvolatile memory and includes an input address part 220a and output data port 220b. The memory can store different regulating voltages used at specific temperatures for the specific alternator charging system requirements of an alternator. The memory could also be programmed at the final test of an alternator system. The memory can be preprogrammed from data stored in a computer 221, as an example. The programmed data can be directed to a specific type of charging system such that the circuit contained on the semiconductor chip can be used for many different types of alternator charging systems. The memory is programmed to ensure the system's use is compatible with a specific charging system. The memory can be designed and manufactured by techniques known to those skilled in the art.

Based upon the B signal from the 8-bit latch 218, the nonvolatile memory 220 generates a data signal to a digital comparator 222 that receives a signal from the 8-bit latch and compares the digital signal with the regulating voltage stored within the nonvolatile memory for the specific temperature that is indicative of the temperature of a battery supplied by the alternator charging system. The digital comparator 222 generates a regulator controlled signal that is used for regulation of the control loop in the charging system.

Figure 3:
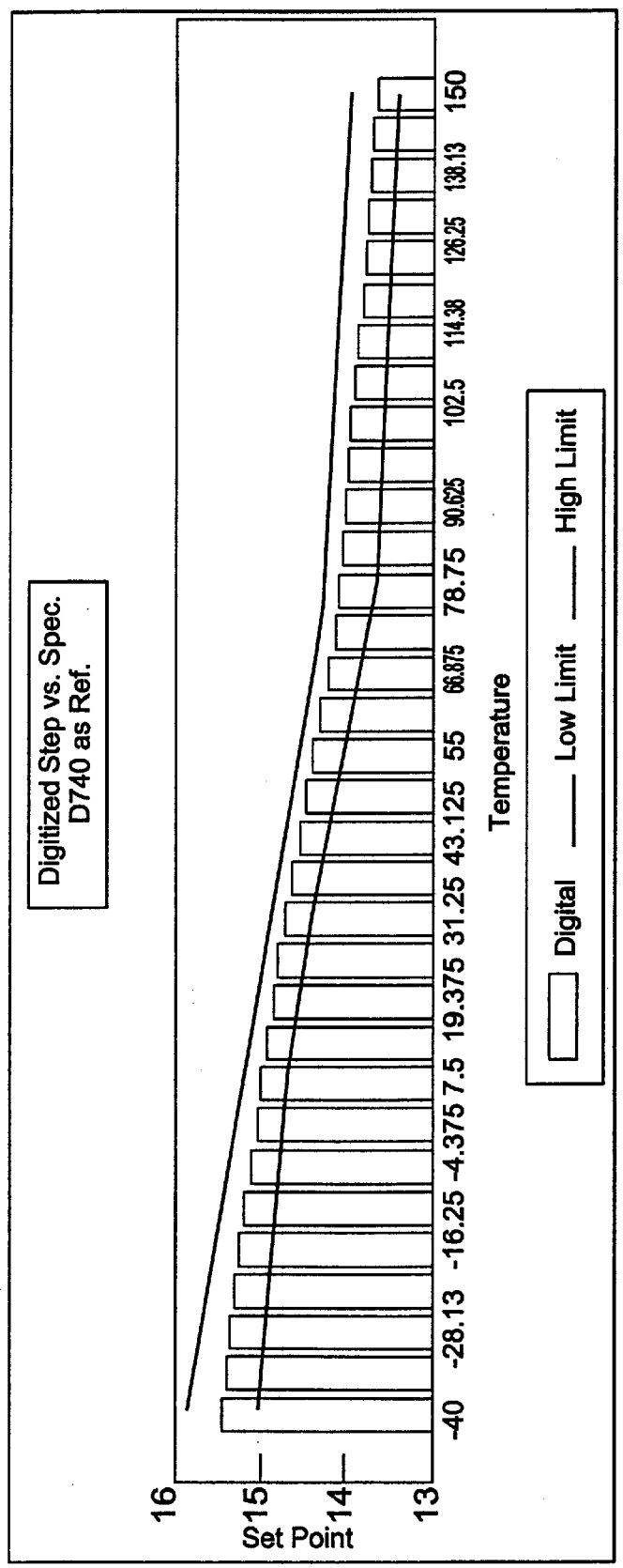
FIG. 3 is a graph showing the comparison of digital steps versus a typical multiple slope analog specification.

The regulation voltages at any given temperature are stored in the non-volatile memory according to the specific charging system requirements. These values are compared digitally with the digitized version of the measured system voltage. An example of the system and method of the present invention shows 32 steps over the temperature range of −40C to 150C in FIG. 3. More or less steps can be used to implement this feature depending on the graticule required by the application.

With 32 steps, the above approximation can be done using an 8-bit data word. The bars represent the digital value at a given temperature range. The lines represent typical specification limits. It is evident that with an 8-bit word, the graticule is not too coarse to cause specification errors at any given temperature. There would be some hysteresis in the temperature sensing/digitizing circuit to prevent any potential for set point oscillation between bits.

To keep the number of bits per step to 8, the range of set points stored in the set point register starts at 10V with 00(hex) and extends to 19V with FF(hex). This allows a wide range of set point curves within a range of 10 to 19 volts, well outside the operating range of automotive charging systems today. With this concept, the step size for one bit is 0.035 volts per step.

Again, this invention is not limited to this range of this graticule. There can be any number of bits used to generate this digital slope method. The number of addresses or data bits can be any various combinations.

This system can be either infinite gain or can use a +/−150 mV gain window for duty cycle. This alternative could be implemented easily by replacing the digital comparator with a difference engine. This would provide a 0% to 100% duty cycle value over a 300 mV window (+/−150 mV from the programmed set point). If necessary, I can generate block diagrams of the fixed gain system.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that the modifications and embodiments are intended to be included within the scope of the dependent claims.

That which is claimed is:

1. A system for regulating an alternator charging system comprising:
   a programmable memory for storing the regulating voltages used at specific temperatures for the specific alternator charging system requirements of an alternator and generating a data signal indicative of the regulating voltage;
   a circuit for generating a digital signal indicative of both the temperature of a battery supplied by the alternator charging system and the charging system voltage and comprising an n-bit latch circuit for receiving digitally multiplexed data representative of the temperature and charging system voltage and outputting latched signals, one of said latched signals being input to said memory; and
   a digital comparator for receiving a latched signal from said n-bit latch circuit and data signal from said memory and comparing the latched signal with the data signal indicative of the regulating voltage stored within the memory for the specific temperature indicative of the temperature of the battery supplied by the alternator charging system and generating a regulator control signal.

2. A system according to claim 1, and further comprising a thermal measuring circuit for measuring the temperature of the battery supplied by the alternator charging system and generating an analog temperature signal corresponding to the measured temperature.

3. A system according to claim 2, and further comprising a multiplexer for receiving the analog temperature signal and an analog signal indicative of the charging system voltage and multiplexing the two signals into a multiplexed signal.

4. A system according to claim 2, further comprising an analog-to-digital converter for converting the analog temperature signal and an analog signal indicative of charging system voltage into a digital signal.

5. A system according to claim 1, wherein said n-bit latch circuit comprises an 8-bit latch.

6. A system according to claim 1, and further comprising an error amplifier circuit for receiving and amplifying an analog signal indicative of the charging system voltage.

7. A system according to claim 1, wherein said memory further comprises a nonvolatile memory.

8. A system for regulating an alternator charging system comprising:
   a nonvolatile programmable memory for storing the regulating voltages used at specific temperatures for the specific alternator charging system requirements of an alternator and generating a data signal indicative of the regulating voltage;
   a temperature measuring circuit for generating an analog temperature signal corresponding to the measured temperature of a battery supplied by the alternator charging system;
   a multiplexer for receiving and multiplexing the analog temperature signal and an analog signal indicative of the charging system voltage into a multiplexed signal;
   an analog-to-digital converter for receiving the multiplexed signal and converting the multiplexed signal into a digital signal and comprising an n-bit latch circuit for receiving digitally multiplexed data representative of the temperature and charging system voltage and outputting latched signals, one of said latched signals being input to said non-volatile memory; and
   a digital comparator for receiving a latched signal from said n-bit latch circuit and data signal from said non-volatile memory and comparing the latched signal with the data signal indicative of regulating voltage stored within the nonvolatile memory for the specific temperature that is indicative of the temperature of a battery supplied by the alternator charging system and generating regulator control signal.

9. A system according to claim 8, wherein said temperature measuring circuit further comprises a sensor for measuring the temperature of the battery supplied by the alternator charging system and generating an analog temperature signal corresponding to the measured temperature.

10. A system according to claim 8, wherein said n-bit latch circuit comprises an 8-bit latch.

11. A system according to claim 8, and further comprising an error amplifier circuit for receiving and amplifying an analog signal indicative of the charging system voltage.

12. A method for regulating an alternator charging system comprising the steps of:
   storing in a programmable memory the regulating voltages used at specific temperatures for the specific alternator charging system requirements of an alternator and generating a data signal indicative of the stored regulating voltage;
   generating a digital signal indicative of the temperature of a battery supplied by the alternator charging system and the charging system voltage by generating digitally multiplexed data representative of the temperature and charging system voltage into an n-bit latch circuit and outputting latched signals into the memory and into a digital comparator; and
   digitally comparing the latched signal from said n-bit latch circuit with the data signal indicative of the regulating voltage stored within the nonvolatile memory for the specific temperature that is indicative of the temperature of a battery supplied by the alternator charging system.

13. A method according to claim 12, wherein the step of generating a digital signal indicative of the temperature of a battery comprises the step of measuring the temperature of a battery supplied by the alternator charging system and generating an analog temperature signal corresponding to the measured temperature.

14. A method according to claim 12, and further comprising the step of multiplexing the analog temperature signal with an analog signal indicative of the charging system voltage.

15. A method according to claim 14, and further comprising the step of digitally converting the multiplexed analog temperature signal and analog signal indicative of the charging system voltage into the digital signal indicative of the temperature of a battery supplied by the alternator charging system and the charging system voltage.

16. A method according to claim 12, wherein said n-bit latch circuit comprises an 8-bit latch.

17. A method according to claim 12, and further comprising the step of amplifying a charging system voltage signal through an error amplifier circuit.

18. A method according to claim 12, and further comprising the steps of storing the regulating voltages within a nonvolatile memory.

* * * * *